Figure 1:
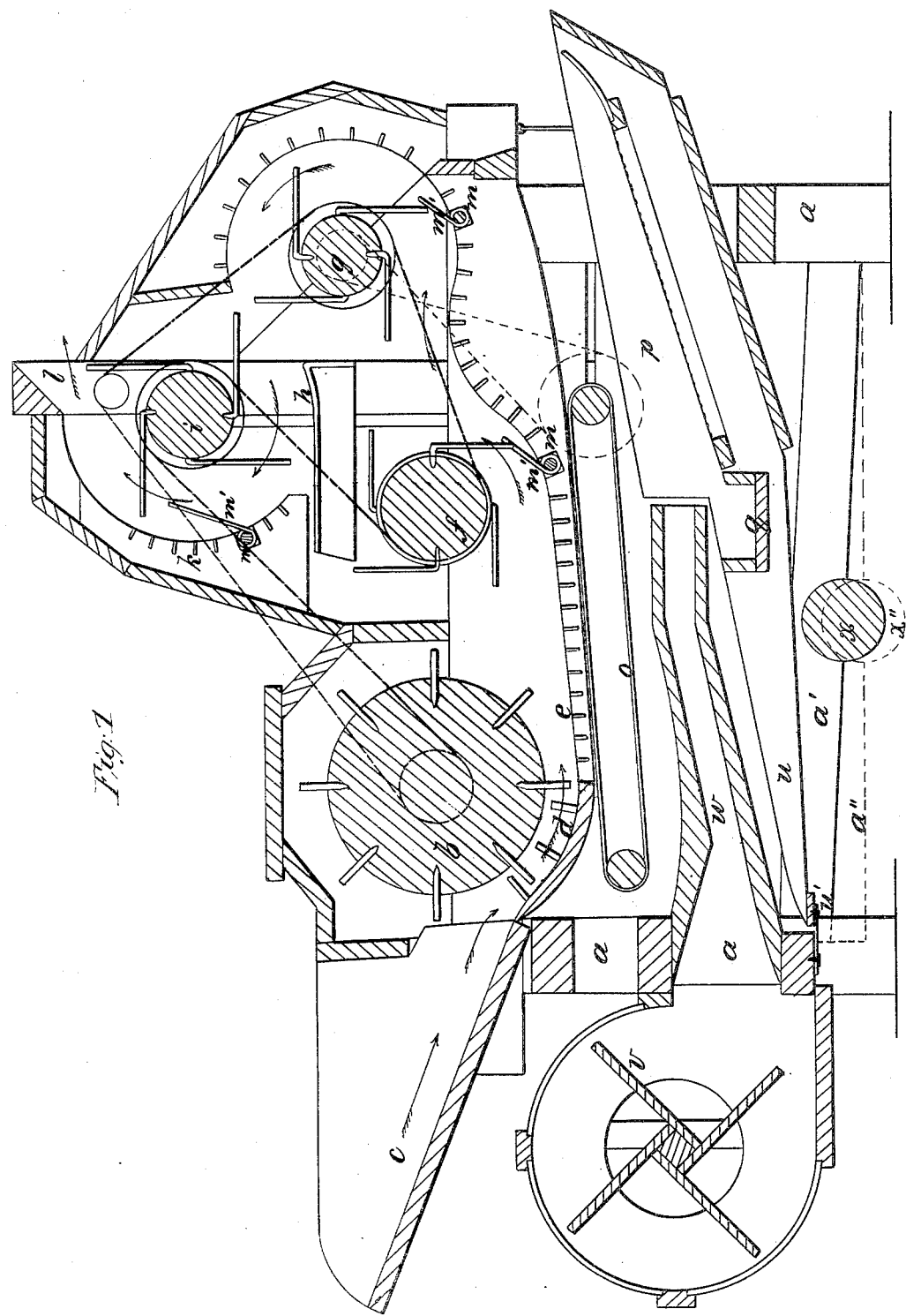

I. J. RICHARDSON

THRESHING AND GRAIN-SEPARATING MACHINE

NO. 6,232 PATENTED MARCH 27, 1849

2 Sheets - Sheet 1.

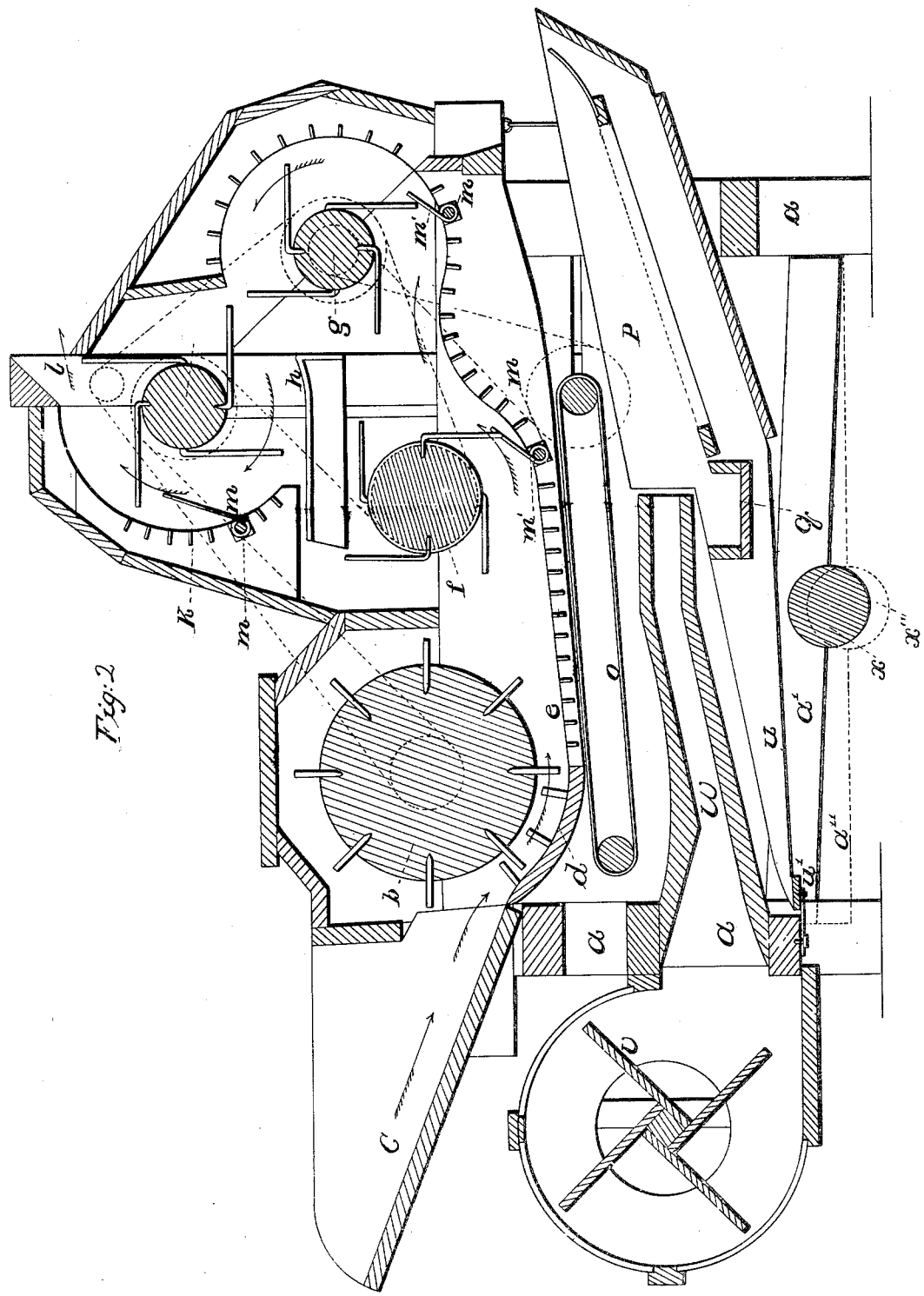

UNITED STATES PATENT OFFICE.

I. J. RICHARDSON, OF NEW YORK, N. Y.

THRESHING AND GRAIN-SEPARATING MACHINE.

Specification of Letters Patent No. 6,232, dated March 27, 1849.

*To all whom it may concern:*

Be it known that I, ISRAEL J. RICHARDSON, of New York, in the county of New York and State of New York, have invented certain Improvements in Straw-Carriers and in Machines for Thrashing and Cleaning Grain, and that the following is a full, clear, and exact description of the principle or character which distinguishes them from all other things before known and of the usual manner of making, modifying, and using the same, reference being had to the accompanying drawings, herewith connected, in which—

Figure 1 is a vertical longitudinal section. Fig. 2 is a side elevation.

The nature of my invention consists in arranging and combining a threshing machine, straw carrier, and riddles, fan, and screen, in a compact, portable form; the straw carrier being of an entirely new construction, for the purpose of combining lightness with efficiency of action; a contrivance being also added, by which the machine is readily moved about and loaded onto a waggon, or unloaded, as may be desired.

The frame (a) of my machine, containing the threshing cylinder, straw carrier, and cleaner, will not exceed five feet in length, if properly constructed. It consists of four posts, with proper caps and rails, as represented in Fig. 2; near one end of this frame the threshing cylinder (b) is situated, of ordinary construction, and having a feeding board or hopper (c) in front of it, and a concave (d) below; from the inner edge of this concave (d) a grating (e) composed of thin slats placed on edge, extends under a revolving rake (f) placed immediately behind the threshing cylinder, and thence under a second revolving rake, and then rises in a convex line to the back post of the frame whence it sweeps round upward in a semi-circle concentric with the second revolving rake (g), by means of which the straw, which follows the course indicated by the red arrows, is carried up and turned over, passing forward again and discharged through a narrow opening onto a stationary cap or apron (h) the uses of which will hereafter be more fully explained, from whence it is taken by a third revolving rake (i) and carried upward and again turned over, guided by a segmental grating (k) and thrown out of the machine at the opening (l).

Under or behind each of the revolving rakes, there is a bar (m) situated in the gratings (e and k) to which are attached a row of spiral spring teeth (m') each tooth being coiled around the bar once or twice in a recess made for that purpose, and with the end projecting, as shown in Fig. 1, by which elasticity is given to the teeth, and by which the straw, as it passes the revolving rakes, is the more effectually agitated to enable the grain to escape. The teeth of all three of the revolving rakes are set tangential instead of being placed radial as in ordinary revolving rakes; but this feature is not new. The revolving rakes are propelled by means of a band from the threshing cylinder or may be geared to it by cog wheels to subserve the same purpose.

It is well known that in threshing the grain, as it passes the cylinder is thrown in all directions, and if unimpeded, to great distances, hence the supposed necessity that has been found in carrying the straw to great distances and shaking it continually to cause its complete separation from the grain, and hence the machines that have been hitherto constructed for this purpose have uniformly been made of large dimensions and unwieldy size, rendering them inconvenient in removal or transportation; and even with the best straw carriers much grain is carried away with the straw; this is obviated by my apparatus by the course the straw is made to take, combined with the apron (h) above named, which stops the grain from flying up, and lodging in the straw; and without this apron it is found impracticable to prevent the grain from lodging in the straw, and passing off with it, even if carried to a great height; but with the apron (h) placed as above indicated, the whole is brought within a small compass, and the grain is effectually prevented from escaping—its use is therefore indispensable.

The grain, when past the cylinder, falls through the grating onto an endless revolving apron (o) placed below it, which carries the grain backward in the same direction with the straw till it comes over the shaking shoe screen (p) onto which it falls through a current of air from the fan, when it is winnowed and screened, and passes down into an inclined lateral trough (q) at the end of the screen, whence it is guided out to one side into an elevator, the case (r)

of which is shown in Fig. 2. This elevator is of ordinary construction, and therefore needs no particular description, as it is well known to all ordinary machine makers; it is driven by a band (*s*) from the third revolving rake; its use is to elevate the grain into a short trough (*t*) whence it is discharged into a bag, or other convenient receptacle.

The shoe (*u*) is pivoted on the front bar of the frame at (*u'*) and is shaken by the ordinary bell crank, a well known device, and not represented in the drawing. The fan (*v*) is placed directly under the feeding board (*c*) and is attached to the front posts; from it a wind trunk (*w*) extends backward to the screen, against the upper side of which it directs its blast; the fan is driven by a band (*v'*) Fig. 2, from the first revolving rake.

The two lower side rails (*a' a'*) of the frame are jointed to the hind posts and slide up and down in long mortices in the front posts, shown by slotted lines in the drawing. About the center of the length of these rails there is a roller (*x*) that reaches across from one side to the other, where the front ends of the rails are forced down to the lower part of the mortise, and indicated by the red lines (*a" x"*) Fig. 1, the whole machine may be made to rest on said roller (*x*) and by means of which it can readily be loaded upon a waggon or moved about from place to place. When not wanted in working position the ends of the rails are raised to the tops of the mortises described, and there made fast by pins or other means which supports the roller above the ground, leaving the machine at liberty to rest firmly on its feet.

Having thus fully described my improved apparatus for cleaning grain, what I claim therein as new, and for which I desire to secure Letters Patent, is—

1. The straw carrier, constructed and arranged as above described, consisting of three or more revolving rakes, so arranged as to cause the straw to turn over in its passage out of the machine, substantially in the manner and for the purpose set forth.

2. I claim in combination therewith, the apron (*h*) as above made known. I also claim the elastic teeth (*m'*) placed opposite the revolving rakes for lightening the straw, combined with the teeth of said revolving rakes and arranged as above specified.

3. I also claim, in combination with the above named straw carrier, Fig. 2, the revolving apron (*o*) for conveying the grain to the screen, as set forth.

4. I claim the movable lower side rails (*a'*) and roller (*x*) attached thereto, for the convenience of moving the machine, as hereinbefore described.

ISRAEL J. RICHARDSON.

Witnesses:
J. J. GRUNOUGH.
T. C. DONN.